3,297,661
CROSS-LINKING HYDROCARBON POLYMERS WITH POLYAZIDES IN THE PRESENCE OF SULFUR
David S. Breslow and Arnold F. Marcantonio, Wilmington, Del., assignors to Hercules Incorporated, a corporation of Delaware
No Drawing. Filed Mar. 27, 1964, Ser. No. 355,432
10 Claims. (Cl. 260—79.5)

This application is a continuation-in-part of copending application Serial No. 230,699 filed October 15, 1962, and Serial No. 209,228 filed July 11, 1962, now abandoned.

This invention relates to cross-linking hydrocarbon polymers. More particularly, the invention relates to cross-linking hydrocarbon polymers with aromatic polyazides in the presence of sulfur.

It has recently been discovered that hydrocarbon polymers can be cross-linked when heated with aromatic polyazides. Now, in accordance with this invention, it has unexpectedly been found that the cross-linking of hydrocarbon polymers with aromatic polyazides can be greatly improved by the addition of a small amount of sulfur. The resulting vulcanizates are solvent resistant and odor free.

Accordingly, the present invention relates to a process for cross-linking a hydrocarbon polymer which comprises heating said polymer with an aromatic polyazide having the formula $R(N_3)_x$ where R is an aromatic grouping inert to the cross-linking reaction and $x$ is an integer greater than 1 in the presence of a small amount of sulfur.

The aromatic polyazides useful in the present invention have the general formula $R(N_3)_x$ where R is an aromatic grouping inert to the cross-linking reaction, and $x$ is an integer greater than 1. Preferably $x$ will be an integer from 2 to 100 and R will be selected from the group of organic radicals consisting of arylene and alkarylene radicals. Exemplary of the aromatic polyazides useful in this invention are m-phenylene diazides 2,4,6-triazidobenzene, 4,4'-diphenyl diazide, 4,4'-diphenylmethane diazide, 4,4'-diazidodiphenylamine, 4,4'-diazidodiphenylsulfone, 2,2' - dinitro - 4,4' - diazidodiphenyl, 2,7 - diazidonaphthalene and 2,6-diazidoanthraquinone. It will, of course, be obvious to those skilled in the art that still other aromatic polyazides containing functional groups, which are inert to cross-linking reactions, such as halogen, ester, azo, aldoxime, nitro, etc., groups, are included in the above definition. These functional groups must be meta or para to the azido group so as not to hinder cross-linking activity.

The aromatic polyazides can be prepared in various ways, as for example, by diazotizing the corresponding aromatic amine and treating it with hydrazoic acid. The reaction can be shown by the following equation:

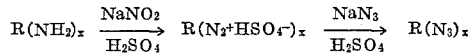

where R and $x$ are as defined above. The aromatic amines are well-known materials whose preparation is described in the chemical literature.

Any type of hydrocarbon polymer, including saturated, unsaturated, linear, atactic, crystalline or nonlinear amorphous polymers, as for example, polyethylene, polypropylene, polystyrene, styrene-butadiene rubber, isobutylene-isoprene copolymer, natural rubber, polybutadiene, polyisobutylene, ethylene-propylene copolymer, cis-1,4-polyisoprene, ethylene-propylene-dicyclopentadiene terpolymer, etc., and blends of these polymers with each other, can be cross-linked or otherwise modified in accordance with this invention.

The cross-linking or other modification is carried out by heating the hydrocarbon polymer plus the aromatic polyazide and sulfur above the decomposition temperature of the polyazide. This temperature can be varied over a wide range but generally will be from about 90° C. to about 300° C. Various amounts of aromatic polyazide and sulfur can be added, the optimum amount depending upon the amount of cross-linking or other modification desired, the specific aromatic polyazide employed, etc. In general, the amount of aromatic polyazide added, based on the weight of the polymer, will be from about 0.001% to about 30% and the amount of sulfur added will be from about 0.0001% to about 5%, based on the weight of the polymer. The smaller amounts of aromatic polyazide and sulfur improve the properties of the polymers without materially affecting their solubility.

The aromatic polyazide and sulfur can be incorporated in the polymer in a number of ways. For example, they can be uniformly blended by simply milling on a conventional rubber mill or dissolved in a solution containing the polymer. By either means, the aromatic polyazide and sulfur are distributed throughout the polymer and uniform cross-linking or other modification is effected when the blend is subjected to heat. Other means of mixing the aromatic polyazide and sulfur with the polymer will be apparent to those skilled in the art.

In addition to the aromatic polyazide and sulfur, other ingredients can also be incorporated. Additives such as extenders, fillers, pigments, plasticizers, dyes, stabilizers, etc., can be used, but the presence or absence of such additives is immaterial to this invention.

The following examples are presented to illustrate the process of modifying polymers in accordance with this invention, parts and percentages being by weight unless otherwise specified. In the examples, the extent of cross-linking can be determined by analysis for percent gain in insolubility in solvents in which the uncross-linked polymer was soluble and for the degree of swell therein, hereinafter termed "percent gel" and "percent swell." Percent gel is indicative of the percentage of polymer that is cross-linked and percent swell is inversely proportional to the cross-link density. Percent gel and swell are determined as follows: A weighed sample of cross-linked polymer is soaked in a solvent, in which the uncross-linked polymer was soluble, at an elevated temperature for a specified length of time. The sample is then removed, blotted on filter paper so as to remove the solvent on the surface and weighed at once. The swollen sample is then dried to constant weight. The weights of initial and final sample are corrected for polymer and copolymer content based on knowledge of components. From these figures $$\frac{\text{corrected dry weight}}{\text{corrected initial weight}} \times 100 = \text{percent gel}$$

$$\frac{\text{corrected swollen weight-corrected dry weight}}{\text{corrected dry weight}} \times 100 =$$

percent swell

The molecular weight of the polymers cross-linked in the examples can be indicated by their Reduced Specific Viscosity (RSV). By the term "Reduced Specific Viscosity" is meant the $\eta sp/C$ determined on an 0.1% solution (0.1 g. of the polymer per 100 ml. of solution) of the polymer at elevated temperature.

*Examples 1–3*

Three samples of a high density polypropylene having an RSV of 3.8 (determined in decahydronaphthalene at a temperature of 135° C.) were blended with either sulfur or an aromatic polyazide or a mixture of sulfur and an aromatic polyazide as follows. Two of the samples were slurried with an ethylene dichloride solution of the polyazide and then evaporated to dryness. One of the resulting mixtures and the third sample were then compounded with a small amount of sulfur. Each blend was then compression molded for 6 minutes at a temperature of 216° C. The formulations and gel-swell measurements are shown in Table I.

TABLE I

|  | Example Number | | |
| --- | --- | --- | --- |
|  | 1 | 2 | 3 |
| Polypropylene, parts | 100 | 100 | 100 |
| 4,4'-Diazidodiphenylmethane, parts | | 2 | 2 |
| Sulfur, parts | | 0.2 | |
| Percent Gel* | 0.2 | 76.1 | 50.6 |
| Percent Swell* | 0 | 2,120 | 2,450 |

*As determined in decahydronaphthalene at 140° C.

Examples 4 and 5

Two samples of an ethylene-propylene-dicyclopentadiene terpolymer having an RSV of 1.5 (determined in decahydronaphthalene at a temperature of 135° C.) and containing 39 weight percent of ethylene, 46 weight percent of propylene and 15 weight percent of dicyclopentadiene were cross-linked with 4,4'-diphenylmethane diazide. A small amount of sulfur was added to one of the samples. Each sample was compounded with carbon black and an antioxidant on a two-roll mill at room temperature for 20 minutes. The formulations are given below.

|  | Parts | |
| --- | --- | --- |
|  | 4 | 5 |
| Ethylene-propylene-dicyclopentadiene terpolymer | 100 | 100 |
| High abrasion furnace black | 50 | 50 |
| 4,4'diphenylmethane diazide | 2 | 2 |
| Polymerized trimethyl dihydroquinoline | 0.5 | 0.5 |
| Sulfur | | 0.2 |

Each formulation was heated in a closed iron mold at a temperature of 170° C. for 30 minutes. The resulting vulcanizates were tested and the results are shown in Table II.

TABLE II

|  | 4 | 5 |
| --- | --- | --- |
| Modulus at 200% elongation, p.s.i | 1,885 | 1,810 |
| Tensile strength, p.s.i | 2,540 | 2,940 |
| Elongation at break, percent | 250 | 260 |
| Shore A Hardness | 67 | 69 |
| Break set, percent | 0 | 5 |

Example 6

To 2.06 parts of an isobutylene polymer (having a molecular weight of approximately 70,000), dissolved in 68 parts of n-heptane, was added 0.16 part of 4,4'-diphenylmethane diazide and 0.016 part of sulfur. The heptane solvent was allowed to evaporate overnight and the blend was then cured in a closed iron mold for 1 hour at a temperature of 160° C. A control sample was treated in exactly the same way except no sulfur was added. The sample treated with both diazide and sulfur had a percent gel of 66 as determined in an excess of toluene at 80° C., while the control had a percent gel of 30 when tested under the same conditions.

Examples 7 and 8

Two butyl rubber compositions were prepared, a control with no sulfur and a composition with both sulfur and diazide. Each composition was compounded on a two-roll mill for 20 minutes at 52° C. The formulations of these two compositions were as follows:

| Ingredients | Parts | |
| --- | --- | --- |
|  | 7 | 8 |
| Isobutylene-isoprene copolymer* | 100 | 100 |
| High abrasion furnace black | 50 | 50 |
| 4,4'-diphenyldiazide | 2 | 2 |
| Sulfur | 0 | 0.2 |

*Containing 2.2 mole percent isoprene and having a molecular weight of approximately 45,000.

Each composition was heated in a closed iron mold for 45 minutes at a temperature of 170° C. The resulting vulcanizates were tested for percent gel in an excess of toluene at 80° C. The control sample (Example 7) had a percent gel of 51, while the sample treated with both sulfur and diazide (Example 8) had a percent gel of 77.

Examples 9 and 10

Two styrene-butadiene rubber compositions were prepared, a control with no sulfur and a composition with both sulfur and diazide. Each composition was compounded on a two-roll mill for 20 minutes at 38° C. The formulations of these two compositions are shown below.

| Ingredients | Parts | |
| --- | --- | --- |
|  | 9 | 10 |
| Styrene-butadiene copolymer* | 100 | 100 |
| High abrasion furnace black | 50 | 50 |
| 4,4'-diphenylsulfone diazide | 1 | 1 |
| Sulfur | 0 | 0.1 |

*Containing 23 weight percent styrene.

Each composition was heated in a closed iron mold for 45 minutes at a temperature of 170° C. The resulting vulcanizates were tested for percent gel in an excess of toluene at a temperature of 80° C. The control sample (Example 9) had a percent gel of 82, while the sample treated with both sulfur and diazide (Example 10) had a percent gel of 97.

Examples 11 and 12

Two samples of finely divided polyethylene (having an RSV of 2.5 as determined in decahydronaphthalene at 135° C.) were slurried with an acetone solution of 2,6-diazidoanthraquinone and evaporated to dryness. One of the blends was then compounded with a small amount of sulfur. Each blend was compression molded in an iron mold between aluminum foil for 20 minutes at a temperature of 204° C. under a pressure of 800 p.s.i. The formulations and percent gel measurements are tabulated below.

|  | 11 | 12 |
| --- | --- | --- |
| Polyethylene, parts | 100 | 100 |
| 2,6-Diazidoanthraquinone, parts | 5 | 5 |
| Sulfur, parts | 0 | 0.5 |
| Percent gel* | 49 | 78 |

*As determined in decahydronaphthalene at 135° C.

Examples 13 and 14

Two samples of finely divided polystyrene molding powder (having a molecular weight of approximately 300,000) were slurried with an acetone solution of 2,6-diazidoanthraquinone and evaporated to dryness. One of the blends was then compounded with a small amount of sulfur. Each blend was compression molded in an iron mold between aluminum foil for 6 minutes at a temperature of 288° C. under a pressure of 800 p.s.i. The formulations and percent gel measurements are tabulated below.

|  | 13 | 14 |
|---|---|---|
| Polystyrene, parts | 100 | 100 |
| 2,6-Diazodianthraquinone, Parts | 5 | 5 |
| Sulfur, parts | 0 | 0.5 |
| Percent gel* | 34 | 63 |

*As determined in benzene at 25° C.

*Examples 15 and 16*

Two natural rubber compositions were prepared, a control with no sulfur and a composition with both sulfur and diazide. Each composition was compounded on a two-roll mill for 15 minutes at a temperature of 66° C. The formulations of these two compositions are shown below.

| Ingredients | Parts | |
|---|---|---|
|  | 15 | 16 |
| Natural rubber* | 100 | 100 |
| High abrasion furnace black | 50 | 50 |
| 4,4'-Diphenylsulfone diazide | 1 | 1 |
| Sulfur | 0 | 0.1 |

*Smoked sheet.

Each composition was heated in a closed iron mold for 20 minutes at a temperature of 170° C. The resulting vulcanizates were tested for percent gel in an excess of toluene at 80° C. The control sample (Example 15) had a percent gel of 87, while the sample treated with both sulfur and diazide (Example 16) had a percent gel of 98.

What we claim and desire to protect by Letters Patent is:

1. The process of modifying a hydrocarbon polymer which comprises heating said polymer in a closed system in admixture with a composition consisting essentially of a small amount of sulfur and an aromatic polyazide having the formula $R(N_3)_x$ where R is an aromatic radical, inert to the modification reaction, selected from the group consisting of arylene and alkarylene radicals and $x$ is an integer from 2 to 3, said sulfur and aromatic polyazide being present in the composition in a weight ratio of sulfur to aromatic polyazide of less than 1.

2. The process of claim 1 wherein the aromatic polyazide is 4,4'-diphenylmethane diazide.

3. The process of claim 1 wherein the aromatic polyazide is 4,4'-diphenyl diazide.

4. The process of claim 1 wherein the aromatic polyazide is 4,4'-diphenylsulfone diazide.

5. The process of claim 1 wherein the aromatic polyazide is 2,6-diazidoanthraquinone.

6. The process of claim 1 wherein the hydrocarbon polymer is polypropylene.

7. The process of claim 1 wherein the hydrocarbon polymer is polyethylene.

8. The process of claim 1 wherein the hydrocarbon polymer is an ethylene-propylene-dicyclopentadiene terpolymer.

9. The process of claim 1 wherein the hydrocarbon polymer is polystyrene.

10. The process of claim 1 wherein the hydrocarbon polymer is an isobutylene-isoprene copolymer.

References Cited by the Examiner

UNITED STATES PATENTS

| 2,852,379 | 9/1958 | Hepher et al. | 96—91 |
| 3,000,866 | 9/1961 | Tarney | 260—79.5 |
| 3,012,016 | 12/1961 | Kirk et al. | 260—79.5 |
| 3,075,950 | 1/1963 | Newland et al. | 260—79 |
| 3,203,936 | 8/1965 | Breslow et al. | 260—807 |

FOREIGN PATENTS 594,393  6/1959  Italy.

JOSEPH L. SCHOFER, *Primary Examiner.*

D. K. DENENBERG, *Assistant Examiner.*